Nov. 19, 1957     J. W. PAYNE ET AL     2,813,352
METHOD FOR REMOVING LIQUIDS FROM GRANULAR SOLIDS
Filed Aug. 17, 1955     4 Sheets-Sheet 1

INVENTORS
John W. Payne
Joe E. Penick
BY
Andrew L. Jabouault
AGENT

INVENTORS
John W. Payne
Joe E. Penick
BY
Andrew L. Jabriault
AGENT

Nov. 19, 1957   J. W. PAYNE ET AL   2,813,352
METHOD FOR REMOVING LIQUIDS FROM GRANULAR SOLIDS
Filed Aug. 17, 1955   4 Sheets—Sheet 4

INVENTORS
John W. Payne
Joe E. Penick
BY Andrew L. Jabonault
AGENT

United States Patent Office 2,813,352
Patented Nov. 19, 1957

2,813,352

METHOD FOR REMOVING LIQUIDS FROM GRANULAR SOLIDS

John W. Payne, Woodbury, N. J., and Joe E. Penick, Augusta, Kans., assignors to Socony Mobil Oil Company, Inc., a corporation of New York Application August 17, 1955, Serial No. 529,029

6 Claims. (Cl. 34—10)

This application is a continuation in part of our co-pending application Serial No. 277,983, filed March 22, 1952, now abandoned.

This invention is concerned with a process for drying and regenerating granular solids and particularly with a process for drying and regenerating granular adsorbent solids in such a manner that the adsorbent retains its activity over long periods of time. More particularly, this invention deals with an improved method for heating and drying solids by indirect heat transfer. Typical of processes to which this invention applies is the continuous percolation of liquid hydrocarbon oils through granular adsorbent solids to remove undesirable impurities in the oil wherein liquid hydrocarbon oil is passed upwardly through a downwardly gravitating bed of granular adsorbent solids, such as fuller's earth, to effect the desired treatment. The used adsorbent is then washed free of liquid oil with a wash solvent and passed to a regeneration zone where the adsorbent is reconditioned for reuse in the treating zone.

It has been found desirable to remove the liquid with solvent or any other liquid from the adsorbent in such processes before passing it to the regeneration zone to prevent undue losses of solvent and high cooling requirements in the regeneration zone. One of the major problems in the design of any system to evaporate the liquid is to provide for optimum heat transfer between the granular material and the heating medium which furnishes the heat of evaporation. A small variation in heat transfer rate may have a very marked effect on the economy of the process.

In addition, when drying and regenerating adsorbents, a further difficulty encountered is the loss in activity of the adsorbent after a few treating cycles due to moisture content of the adsorbent. It has been found that when the moisture content exceeds a certain critical limit, satisfactory regeneration cannot be achieved. In order to avoid exceeding this limit we have discovered that the adsorbent must be maintained above a certain critical temperature during all the time it is in contact with moisture.

It is a major object of this invention to provide a method for the evaporation of liquid material from granular contact material which overcomes the above-described difficulties.

Another object of this invention is to provide a method for evaporation of liquid from adsorbents of palpable particulate form in a continuous percolation process wherein the efficiency of the adsorbent is maintained at a satisfactory level throughout a large number of treating cycles.

Another object of this invention is to provide a method for evaporation of liquid from granular contact material by indirect heat exchange wherein optimum efficiency of heat transfer to the contact material in the drying zone is achieved. These and other objects will become apparent from the following description of the invention.

This invention discloses a method for evaporating liquids from granular contact material wherein a bed of the contact material is maintained in an enclosed evaporation zone in a state of ebullient motion which resembles a boiling fluid. Granular contact material which has liquid material deposited thereon, is supplied to the bed and dried contact material freed of the vaporizable material removed therefrom. Heat transfer tubes are spaced throughout the bed to provide the heat necessary for evaporation by indirect heat exchange. A stripping gas is passed upwardly through the bed at a rate which provides for most efficient heat exchange between the fluid in the tubes and the bed. This stripping gas acts to strip any vaporized material from the granular solids. When the granular contact material is an adsorbent, conditions of temperature and presure within the bed and the transfer system from the evaporation zone to the regeneration zone are maintained such that the moisture content of the adsorbent never exceeds about 4.5 percent by weight.

The invention will be best understood by reference to the attached drawings, of which:

All of these drawings are highly diagrammatic in form.

Figure 1:
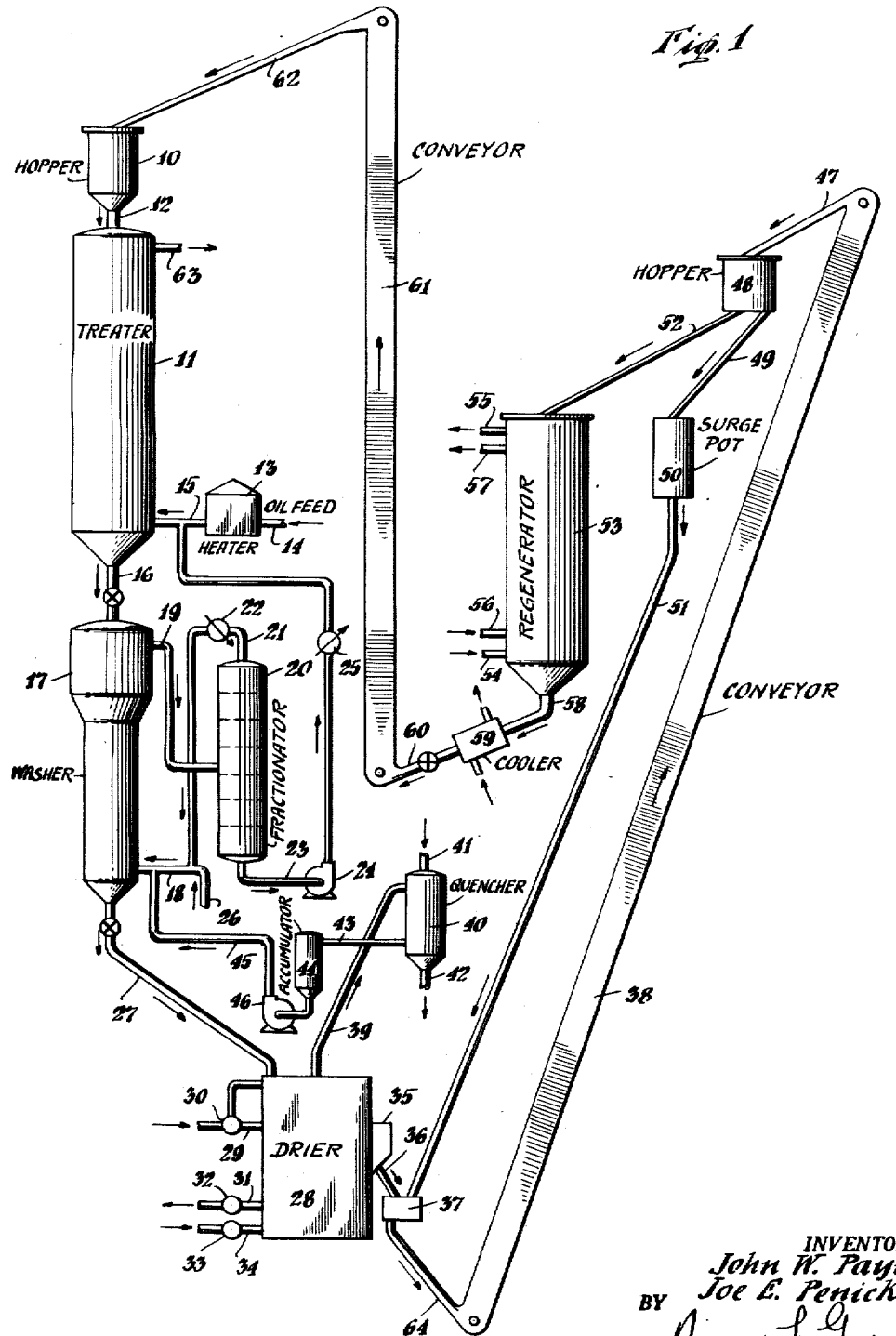
Figure 1 is an elevational view showing the arrangement of a continuous lubricating oil percolation system to which this invention may be applied.
Figure 2:
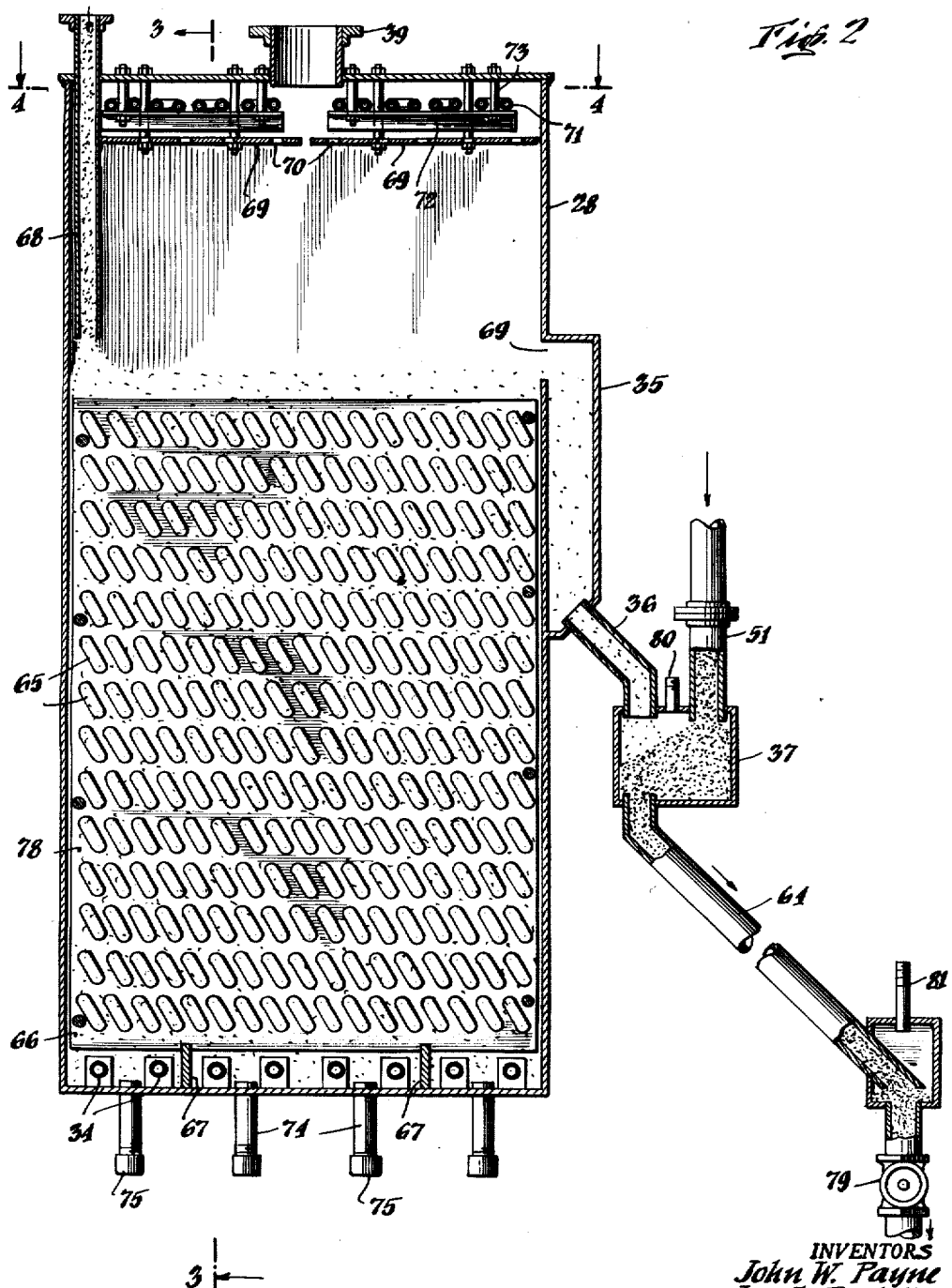
Figure 2 is an elevational view, partially in section, of a suitable evaporator constructed according to this invention.
Figure 3:
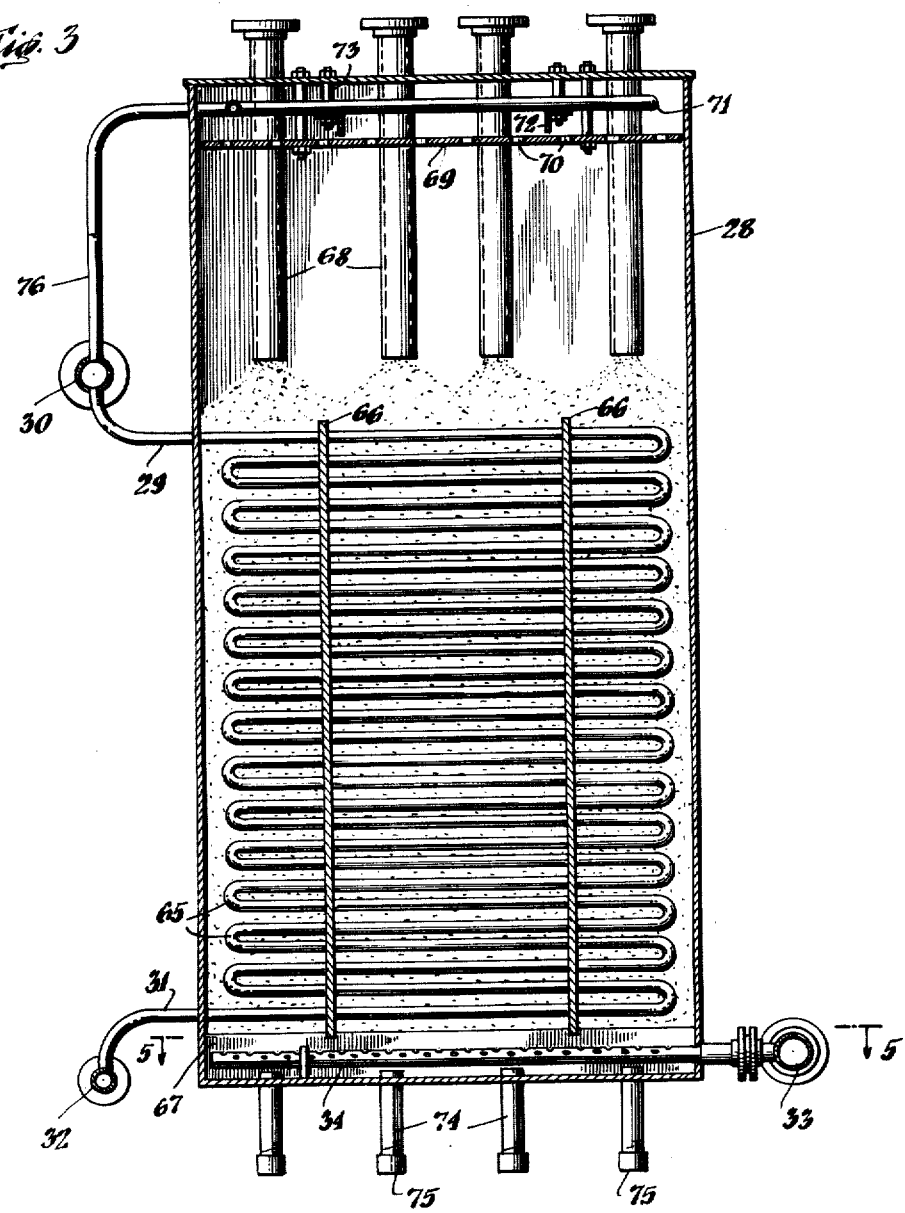
Figure 3 is a sectional view taken along line 3—3 of Figure 2.

Turning to Figure 1, there is shown a typical continuous oil percolation process to which the drying method of this invention may be applied. This process is described in detail and claimed in United States Patent 2,701,786. In Figure 1 there is shown a supply hopper 10 which connects into the upper end of a treating vessel 11 by means of a conduit 12. An oil feed heater 13 is provided with an oil charge conduit 14 and connects by means of conduit 15 into the lower section of chamber 11. A used contact material withdrawal conduit 16 extends from the bottom of treater 11 into the top of washer 17. Washer 17 is provided with a solvent inlet conduit 18 and a solvent outlet conduit 19. Solvent outlet conduit 19 connects into a fractionator 20 having an overhead withdrawal conduit 21 with condenser 22 thereon. Conduit 21 connects into conduit 18. Fractionator 20 is also supplied with a bottoms withdrawal conduit 23 having a pump 24 and heater 25 and connecting into charge conduit 15. Conduit 26 is provided for the addition of make-up solvent to the system.

A contact material withdrawal conduit 27 extends from the bottom of washer 17 into drier or evaporator 28. Vessel 28 is provided with heat transfer tubes (not shown in this drawing) through which are circulated a heating fluid supplied through conduits 29 from manifold 30. Heat transfer fluid is removed through conduits 31 to manifold 32. Stripping steam or naphtha is supplied from manifold 33 through conduits 34. A granular adsorbent removal duct 35 is provided on the side of chamber 28 and connects by means of conduit 36 into combining box 37. An adsorbent discharge conduit extends from box 37 into the bottom of conveyor 38. Conduit 39 for the discharge of stripping gas and other gasiform material connects the upper section of vessel 28 with quencher 40. The quencher is provided with a water inlet 41 and a water outlet 42. A solvent discharge conduit 43 extends from the lower section of quencher 40 into the upper section of accumulator 44. Conduit 45 with pump 46 connects the lower section of accumulator 44 with conduit 18 on washer 17. The upper end of conveyor 38 connects, by means of conduit 47, into a hopper 48. Conduit 49 extends from the bottom of hopper 48 into a surge pot 50 which in turn connects, by means of conduit 51, into combining box 37. A second conduit 52 extends from the bottom of 48 into the top of regenerator 53. Regenerator 53 is provided with oxygen-containing gas inlet 54 and flue gas outlet 55. Cooling coils (not shown) are provided within vessel 53 to control the temperature therein below that temperature which will permanently injure the adsorbent. These coils have a cooling fluid inlet 56 and outlet 57. A regenerated contact material outlet 58 extends from the bottom of vessel 53 into cooler 59 and cooler 59 connects by means of conduit 60 to the bottom of conveyor 61. The top of conveyor 61 connects into hopper 10 by means of conduit 62.

In operation, granular adsorbent contact material gravitates from hopper 10 into the upper section of treating zone 11 through conduit 12. The adsorbent employed should be made up of palpable particles of size within the range about 4–100 mesh and preferably 10–60 and still more preferably 15–30 mesh by Tyler standard screen analysis. The particles may take the form of pellets, capsules, pills, spheres or the like or granules of irregular shape such as are obtained from grinding and screening. The terms adsorbent or contact material in palpable particulate form and palpable particle form adsorbent or contact material as employed herein in describing and claiming this invention are intended to generically cover particles of any or all of these shapes having substantial size as distinguished from finely divided particles. Typical adsorbents which may be used are fuller's earth, bauxite, bentonite and bone char, charcoal, magnesium silicate, heat and acid activated kaolin, and activated carbon.

The adsorbent passes through contacting zone 11 as a downwardly gravitating columnar mass. A liquid oil feed which may be, for example, a fuel oil or lubricating oil of low asphalt content, passes to heater 13 by means of conduit 14 wherein the oil is heated to a suitable temperature for adsorbent contacting. The heated oil is charged to the lower section of contacting zone 11 by means of conduit 15 and passes upwardly through the adsorbent bed therein to effect the desired treatment.

Typical of the purposes for which this treatment may be made are decolorization, neutralization, removal of suspended, colloidal or dissolved impurities such as carbon or coke or oxygen or nitrogen containing impurities and other gum forming compounds and improvement of the demulsibility properties of the oil. The treated oil is removed from the treating zone by means of conduit 63. The used adsorbent bearing a non-vaporizable tar-like carbonaceous contaminant deposit and also liquid oily material gravitates from the bottom of zone 11 into the top of washing zone 17.

In the washing zone the adsorbent is freed of any adhering liquid oil by counter-current contacting with a suitable wash solvent admitted through conduit 18. Typical of suitable solvents are petroleum naphtha boiling within the range 100° F. to 400° F., carbon tetrachloride, normal heptane, normal octane and carbon disulfide. A paraffinic naphtha boiling within the range about 210 to 300° F. is generally preferable. Used solvent, containing dissolved oil, is passed to fractionator 20 by means of conduit 19. In the fractionator, solvent is stripped from the oil and returned to washing zone 17 by means of conduit 21 after condensation. Liquid oil is pumped from the bottom of the fractionator through line 23 and heated by heater 25 to the oil charging temperature. This oil is then added to the charge flowing into treating zone 11. The washed adsorbent bears a non-vaporizable hydrocarbon or carbonaceous deposit and vaporizable organic material, the latter comprising the wash solvent and in some cases small amounts of oily constituents. The washed adsorbent passes from washing zone 17 through line 27 to drying or evaporation zone 28. In zone 28 the contact material is heated by the heat transfer tubes therein and stripped of vaporized solvent by means of stripping gas introduced through conduits 34. The system of Figure 1 is designed to utilize steam as a stripping gas but other gases, such as flue gas, naphtha, and the like, may be used. The steam and vaporized solvent pass out of zone 28 through conduit 29 to quenching zone 40 wherein the steam and organic material stripped from the adsorbent are condensed by cold water admitted through conduit 41. Water and any adsorbent fines carried from zone 28 are removed through conduit 42. Solvent is passed through line 43 to accumulator 44 from which it is returned to washing zone 17 by means of conduit 45. If flue gas or some other inert gas which is relatively more difficult to condense than steam is used, the quenching system may have to be modified to free the stripping gas from the solvent. One method would be to provide a vent at the top of the quencher through which the stripping gas could escape. Dried adsorbent passes from zone 28 through passages 35 and 36 to combining zone 37. Adsorbent is removed from zone 37 through passage 64 at a rate greater than it is supplied through passage 36. Contact material is transported upwardly from conduit 64 to supply hopper 48 by means of conveyor 38. Conveyor 38 may be of any of the forms known in the prior art such as a bucket elevator or gas lift. From supply zone 48 adsorbent gravitates back to combining zone 37 through conduit 49, surge pot 50 and conduit 51 to make up the difference in flow rates between the streams flowing in passages 36 and 64. A second stream of adsorbent passes from supply zone 48 to the upper section of regeneration zone 53 through conduit 52. The contact material passes through the regeneration zone as a substantially compact mass and is contacted therein by an oxygen-containing gas, such as air, admitted through conduit 54. The oxygen-containing gas burns the non-vaporizable contaminant deposit from the adsorbent. Flue gas is removed through conduit 55. Other systems of reconditioning the contact material than that shown in Figure 1 may be used within the scope of this invention. Adsorbent passes from the regeneration zone through conduit 58 and then through cooler 59 wherein the temperature of the adsorbent is reduced to a level suitable for use in the treating zone. Contact material is then supplied to conveyor 61 which elevates the adsorbent to hopper 10.

The details of the drier or evaporator construction are shown in Figures 2, 3, 4 and 5 which will be considered together. Like parts in all of these figures and Figure 1 bear the same numerals. In these figures there is shown drying vessel 28. Heat transfer tubes 65 are spaced throughout the lower section of chamber 28 from a level immediately above the lower end of the vessel to a level substantially below the top of the vessel and are positioned by tube sheets 66. Tube sheets 66 are supported from the bottom of vessel 28 by supports 67. A plurality of wet contact material supply conduits 68 extend from conduit 27 of Figure 1 into the upper section of evaporation chamber 28 and along one wall of that chamber to a level above tubes 65. A slot-type weir 90 extends across the wall of chamber 28 opposite that wall of 28 adjacent to conduits 68 at a level above tubes 65, the point of entry to 90 being laterally displaced from points of discharge from 68. Passage defining means 35, in the form of a duct or conduit, in conjunction with conduit 36 connect weir 90 with combining box 37. Extending across the upper section of vessel 28 at a level above the lower ends of conduits 68 and above passage defining means 35 is a horizontal baffle plate 69, having a plurality of orifices or short passageways 70 which are uniformly spaced and distributed over the horizontal cross-sectional area of the baffle plate. Above plate 69 are fixed heat transfer tubes 71 which are supported from the top of vessel 28 on angle pieces 72 by bolts 73. A discharge conduit 39 extends upwardly from the upper end of vessel 28. A plurality of perforated pipes 34 extend substantially horizontally across vessel 28 beneath tubes 65. These pipes connect at one end to a stripping gas manifold 33. Each orifice or opening in pipes 34 should be located in the center of, and serve, an equal area of the drier. Broadly each orifice should serve from 4 to 20 square inches of drier cross-sectional area. Preferably each orifice should serve about 16 square inches of area. A plurality of conduits 74 extend outwardly from the bottom of chamber 28. These conduits are used to drain chamber 28 during shut downs and are normally capped by caps 75. A charge manifold 30 for heat transfer fluid is provided and a plurality of conduits 29 connect this manifold with tubes 65. A conduit 76 also connects manifold 30 with heat transfer tubes 71. A heat transfer fluid discharge manifold 32 is also provided and conduits 31 connect this manifold and heat transfer tubes 65. A conduit 77 connects manifold 32 and heat transfer tubes 71.

In operation a bed of granular contact material 78 is maintained throughout the lower section of evaporation zone 28 in a state of ebullient motion which resembles a boiling fluid. The upper surface of the bed is maintained a substantial distance below the upper end of the drying zone and the temperature of bed 78 is maintained at a level sufficient to vaporize the vaporizable organic material wetting the contact material by indirect heat exchange with the heating fluid circulating in tubes 65. This temperature should be at least 300° F. and preferably at least 350° F. so that water retained on the adsorbent does not exceed 4.5 percent by weight of the adsorbent on a dry basis. The heat transfer fluid may be steam or other suitable fluid. The heat transfer fluid is supplied to tubes 65 from manifold 30 through conduits 29. Manifold 30 is supplied from an external source. Used heat transfer fluid is discharged from tubes 65 to manifold 32 through conduits 31. Wet contact material having vaporizable organic material thereon is introduced into drying zone 28 and onto one side of the upper surface of bed 78 as a gravitating stream by means of passages 68 at a level substantially below baffle 69. Dried granular contact material is removed from zone 28 at a level adjacent to the upper surface of bed 78 from the side of the bed opposite that to which contact material is supplied, by means of weir 90 and passage 35. It will be noted that wet contact material is supplied to the surface of the bed in the drier and dried contact material is removed also from the surface of the bed. However, the wet contact material and dried contact material are supplied and removed respectively from opposite sides of the bed, thereby avoiding mixing of the two streams. Stripping gas, such as superheated steam, flue gas or naphtha is supplied to the lower section of bed 78 at a rate sufficient to bring about optimum heat transfer between tubes 65 and bed 78 by means of perforated pipes 34 which are supplied from manifold 33. Stripping gas passes upwardly through bed 78 and strips vaporized material from the contact material in bed 78. This stripping gas also acts in conjunction with the vaporized organic material from bed 78 to maintain the bed in a boiling condition. If preheated stripping gas is employed, it may supply a portion of the heat required in the drier. If desired, however, a relatively cool gas such as flue gas at atmospheric temperature may be employed as a stripping fluid in less preferred forms of the invention.

Stripping gas and vaporized material after disengaging from the upper surface of bed 78 pass upwardly as a single stream. There are normally some adsorbent fines entrained in this stream. This stream is subdivided momentarily into a plurality of horizontally spaced apart smaller streams uniformly spaced across the horizontal cross-section of the drying zone at a common level by passage through passages 70 in baffle plate 69. This momentary subdivision creates a significant pressure drop sufficient to promote a uniform withdrawal of the gasiform stream of stripping gas and vaporized material. These small streams are recombined above plate 69 into a single gasiform stream which is heated to a temperature sufficient to prevent condensation of the stripping gas and vaporized material in the gasiform stream by a suitable heating fluid circulated in indirect heat exchange relationship with said gasiform stream through tubes 71, and thereby prevents liquid material dropping back into bed 78 and disrupting conditions therein. The stripping gas and vaporized material are then withdrawn through localized outlet 39 of substantially less cross-sectional area than the drying zone at a level above the subdivision and tubes 71. Tubes 71 are supplied with hot heat transfer fluid from manifold 30 by conduit 76 and discharge cooled heat transfer fluid into manifold 32 through conduit 77. Dried contact material flows over weir 90, the entry to which is laterally displaced from the discharge ends of conduits 68, and falls freely through duct 35. This is accomplished by withdrawing contact material at a rate controlled by orifice 79 above that at which contact material enters duct 35. The difference in flow rate is made up by returning contact material to combining zone 37 through conduit 51. Conduits 36, 51 and 64 are so arranged that conduit 64 preferentially draws contact material from conduit 36 rather than conduit 51. Conduit 51, however, is so placed that some flow always occurs through 51. This feature is described and claimed in U. S. Patent 2,709,674 to E. V. Bergstrom. A suitable purge gas, such as flue gas, or steam, is supplied to zone 37 via pipe 80 at a rate sufficient to maintain a slightly greater pressure in zone 37 than the pressure in the upper portion of drier 28. Most of this inert gas passes upwardly through duct 35 so as to strip solvent and water vapor from the effluent adsorbent. This purge gas is withdrawn through conduit 39. A small amount of purge gas passes downwardly through conduit 64 from chamber 37 and is vented to the boot of elevator 38 by means of conduit 81 above orifice 79. Thus, the pressure is equalized across orifice 79 so that flow therethrough is not upset by pressure and gas flow fluctuations.

The dimensions of the several parts of the drying system will, of course, be dependent on the throughput desired and the type of material being dried. In general, the height of the drying vessel should be greater than its lateral dimensions. The drier should be sufficiently wide so that wet contact material entering through conduits 68 does not flow out through duct 35 before being dried.

Orifices or passageways 70 in plate 69 should be of such a size that the pressure drop across the orifices is substantially greater than the sum of the pressure drops due to flow from bed 78 to the orifices and from above the orifices to outlet 39. Thus, uniform withdrawal of gaseous material across the horizontal cross-section of 28 is accomplished. The temperature within bed 78 should be maintained at a level high enough to vaporize the organic material wetting the contact material. When the contact material is an adsorbent, and a moisture containing stripping gas is used, the temperature of the bed should be maintained at a level above the temperature at which the moisture retained by the adsorbent or the water content of the adsorbent is 4.5 percent by weight and preferably greater than the temperature at which the moisture content is 4 percent by weight. For determination of these moisture limits, adsorbent heated to 1050° F. is taken as being bone dry. In order that these moisture limits are not exceeded, the temperature of bed 78 should be at least 300° F. and preferably at least 350° F.

In most operations, the temperature of the bed will not exceed 450° F. to avoid removing any liquid oil which may be still on the adsorbent and which would contaminate the recovered solvent. However, in some operations it may be desirable to utilize the drier as a preheater for the regenerator in which case the temperature may be as high as 700° F. The dried adsorbent should be passed from the drier to the regenerator under conditions of temperature and atmospheric moisture content such that the water content of the adsorbent remains below about 4.5 percent by weight so as to provide for efficient regeneration. The drier may be operated at any desired pressure below or above atmospheric pressure, but the pressure is preferably maintained near or moderately in excess of atmospheric pressure.

Figure 6:
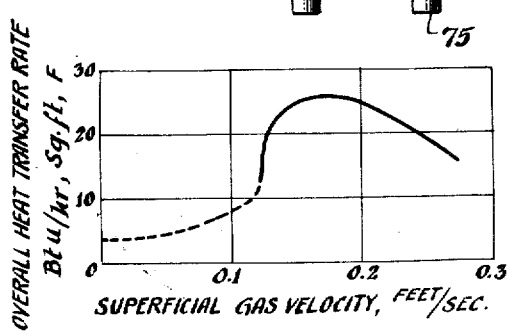
Figure 6 is a graph showing the relationship between the heat transfer coefficient through the heating tubes of the evaporator and stripping gas velocity through the evaporator.
Figure 4:
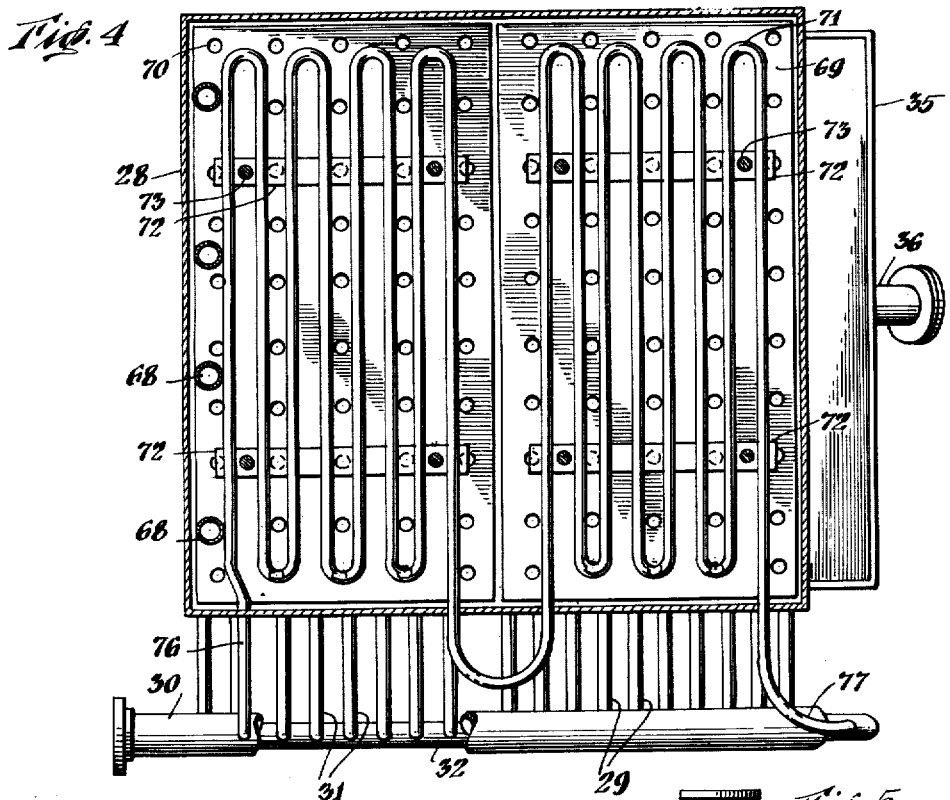
Figure 4 is a sectional view taken along line 4—4 of Figure 2.
Figure 5:
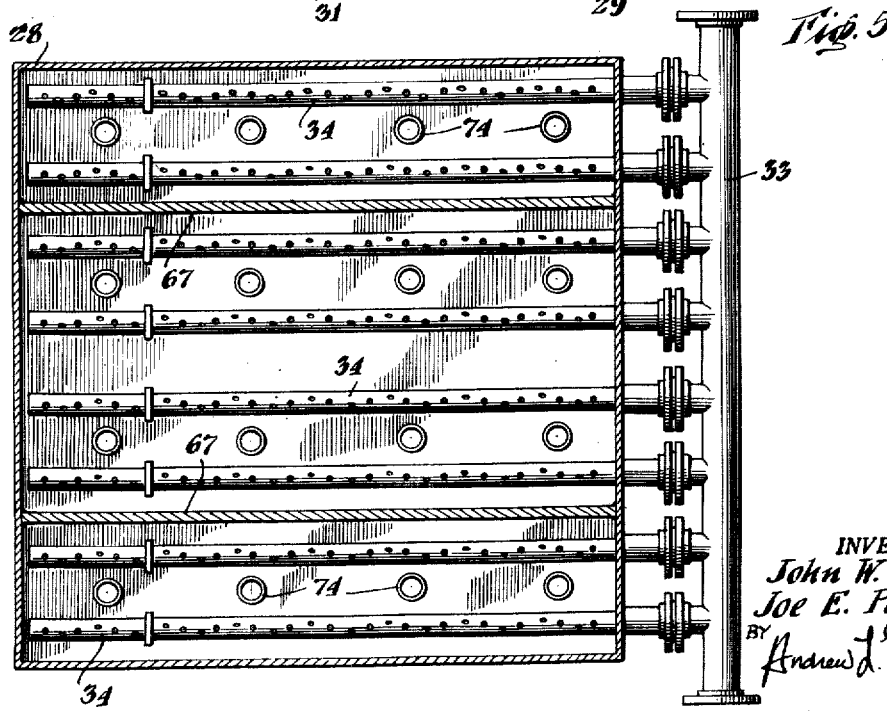
Figure 5 is a sectional view taken along line 5—5 of Figure 3.

It has been found important to control the amount of stripping gas supplied to the drier sufficient to maintain the superficial gas velocity through the drier within a certain critical minimum and maximum range outside of which satisfactory heat transfer rates are not obtained. The critical minimum velocity is substantially above that minimum which would disrupt a compact bed of the granular adsorbent in the drier. The relationship between the superficial velocity of the stripping gas and the rate of heat transfer from the heating tubes to the adsorbent bed is shown in Figure 6 for one adsorbent. The superficial velocity is defined as the linear gas velocity in feet per second calculated on the basis of the horizontal cross-sectional area of the drier when free of adsorbent. The upper solid portion of the curve was determined from an experiment in the drying of fuller's earth, while the lower dashed portion was calculated from previous experiments.

The example shown in Figure 6 involved the removal of adsorbed moisture from a 30/60 mesh Tyler granular fuller's earth adsorbent. Heat was added to the bed of fuller's earth by indirect heat exchange as described above to maintain it at about 225° F. and air was used as a stripping gas. It will be noted from this figure that the heat transfer rate begins to increase when the gas velocity reaches about 0.05 foot per second. The heat transfer rate increases very rapidly when the velocity reaches about 0.13 foot per second. This is the minimum velocity required to uniformly fluidize the bed of adsorbent. The heat transfer rate continues to increase at velocities above the minimum fluidizing velocity until it reaches a maximum at a velocity of about 0.18 foot per second. The heat transfer rate after this point declines with increasing gas velocity. Thus, there is a critical optimum range of gas velocities for drying the adsorbent which lies above the minimum fluidizing velocity.

For fuller's earth adsorbent the stripping gas velocity should be within the range 0.135 to 0.225 foot per second and preferably within the range about 0.150 to 0.200 foot per second.

For any granular solid to which it is desired to transfer heat, the critical ranges demonstrated by Figure 6 may be expressed in terms of the following formulae. Broadly, the superficial velocity of stripping gas should be above the superficial velocity determined from $$V = \frac{67 D_p^2 F^3 \left[ \frac{S_L}{2} + \frac{S_a}{1-F}\left(1 - \frac{S_L}{2S_t}\right) - S_g \right]}{Z(1-F)}$$

and below $$V = \frac{117 D_p^2 F^3 \left[ \frac{S_L}{2} + \frac{S_a}{1-F}\left(1 - \frac{S_L}{2S_t}\right) - S_g \right]}{Z(1-F)}$$

where $V$=superficial velocity of stripping gas in feet per second, $D_p$=average particle diameter of the contact material in inches, $Z$=viscosity of the stripping gas in centipoises, $S_a$=apparent density of the contact material in grams per cubic centimeter, $F$=the fraction voids between the contact material particles under the same conditions at which $S_a$ is determined, $S_L$=density of the liquid wetting the contact material in grams per cubic centimeter, $S_t$=true density of the contact material in grams per cubic centimeter and $S_g$=density of the stripping gas in grams per cubic centimeter. Preferably, the superficial velocity should be within the range, the lower limit of which is $$V = \frac{78 D_p^2 F^3 \left[ \frac{S_L}{2} + \frac{S_a}{1-F}\left(1 - \frac{S_L}{2S_t}\right) - S_g \right]}{Z(1-F)}$$

and the upper limit of which is $$V = \frac{104 D_p^2 F^3 \left[ \frac{S_L}{2} + \frac{S_a}{1-F}\left(1 - \frac{S_L}{2S_t}\right) - S_g \right]}{Z(1-F)}$$

It will be apparent that each pair of these formulae defines a range of velocities all of which are very close to the optimum velocity for efficient heat transfer.

Heat transfer coils should heat the outgoing gases to a temperature of at least 300° F. and preferably at least 400° F. to prevent condensation of the gases. The pressure drop through bed 78 should be from ¼ to ½ pound per square inch per foot of height.

As an example of a suitable drier constructed according to this invention, a drier used in a system for contacting liquid mineral oil with a granular adsorbent will be described. The drying vessel was 5 feet, 1¾ inches by 5 feet in lateral dimensions and 10 feet, 10 inches high. The vessel was filled with heat transfer tubes 65 from a level 7¼ inches above the bottom to a level 6 feet, 5¼ inches above the bottom. The tubes were spaced 3 inches apart. There were 4 conduits 68 extending into the vessel a distance of 2 feet, 10 inches from the top. The top of weir 90 was 2 feet, 10 inches from the top of vessel 28 and the weir was 5 inches high. The weir extended the length of one of the 5 foot walls of 28. There were 8 perforated pipes 34, having 24 perforations of about ⅕ inch in diameter each. Baffle plate 69 was fixed about 6 inches from the top of vessel 28 and had about 70, 1¼ inch holes therethrough. Heat transfer tubes 71 were spaced about 2½ inches from the top of vessel 28. Conduit 39 was 6 inches in diameter.

The material dried in the drier was bauxite ranging in size from 15 to 30 mesh Tyler. Three tons per hour of this adsorbent on a dry basis were charged to vessel 28 through conduits 68. This absorbent contained about 2200 pounds of petroleum naphtha per ton of adsorbent. The temperature of the bed 78 was maintained at about 400° F. by indirect heat exchange with 600 pounds steam. Superheated steam of 400° F. and 18 p. s. i. was used as a stripping gas and was passed through the bed at a superficial velocity of one foot per second. The steam and solvent were reheated to 400° F. by tubes 71 before removal. Flue gas was used as a purge and admitted through conduit 80.

This invention should be understood to cover all changes and modifications of the example of the invention herein chosen for purposes of disclosure which do not constitute departures from the spirit and scope of the invention.

What is claimed is:

1. A continuous process for the continuous evaporation of liquid from wet granular contact material which comprises: maintaining a bed of granular contact material throughout the lower section of a confined evaporation zone in a state of ebullient motion which resembles a boiling fluid, maintaining the temperature of the bed at a level sufficient to vaporize the liquid wetting the granular solids, introducing a stripping gas into the lower section of the bed, passing the stripping gas upwardly through the bed to strip the granular contact material of vaporized liquid at a superficial velocity within the range the lower limit of which is defined by $$V = \frac{67 D_p{}^2 F^3 \left[ \frac{S_L}{2} + \frac{S_a}{1-F}\left(1 - \frac{S_L}{2S_t}\right) - S_g \right]}{Z(1-F)}$$

and the upper limit of which is $$V = \frac{117 D_p{}^2 F^3 \left[ \frac{S_L}{2} + \frac{S_a}{1-F}\left(1 - \frac{S_L}{2S_t}\right) - S_g \right]}{Z(1-F)}$$

where $V$=superficial gas velocity in feet per second, $D_p$=average particle diameter of the granular contact material in inches, $Z$=viscosity of the inert stripping gas in centipoises, $S_L$=density of the liquid wetting the granular contact material in grams per cubic centimeter, $S_a$=apparent density of the granular contact material in grams per cubic centimeter, $F$=the fractional voids between the contact material particles under the same conditions at which $S_a$ is determined, $S_t$=true density of the granular contact material in grams per cubic centimeter, and $S_g$=density of the stripping gas in grams per cubic centimeter, introducing wet granular contact material into the evaporation zone, removing dried granular contact material from the evaporation zone, withdrawing the stripping gas upwardly from the bed surface and removing the stripping gas and vaporized liquid from the upper section of the evaporation zone.

2. A process for evaporating a vaporizable organic liquid from a granular contact material which comprises: maintaining a bed of contact material throughout the lower section of a confined evaporation zone in a state of ebullient motion which resembles a boiling fluid, passing a heat exchange fluid in indirect heat transfer relationship with said bed and heating said bed thereby to a temperature level sufficient to vaporize the vaporizable organic material on the contact material, introducing contact material having vaporizable organic material thereon into the upper section of the evaporation zone and onto one side of the upper surface of said bed, removing contact material substantially free of the vaporizable organic material from the side of the upper surface of said bed opposite the side where contact material is introduced to said bed, passing a stripping gas upwardly through said bed to strip vaporized organic material from the contact material therein at a superficial velocity above that defined by the following formula:

$$V = \frac{78 D_p{}^2 F^3 \left[ \frac{S_L}{2} + \frac{S_a}{1-F}\left(1 - \frac{S_L}{2S_t}\right) - S_g \right]}{Z(1-F)}$$

but below that defined by the formula:

$$V = \frac{104 D_p{}^2 F^3 \left[ \frac{S_L}{2} + \frac{S_a}{1-F}\left(1 - \frac{S_L}{2S_t}\right) - S_g \right]}{Z(1-F)}$$

where $V$=superficial velocity of stripping gas in feet per second, $D_p$=average particle diameter of the contact material in inches, $Z$=viscosity of the inert stripping gas in centipoises, $S_a$=apparent density of the contact material in grams per cubic centimeter, $F$=the fractional voids between the contact material particles under the same conditions at which $S_a$ is determined, $S_L$=density of the vaporizable organic material on the contact material in grams per cubic centimeters, $S_t$=true density of the contact material in grams per cubic centimeter, and $S_g$=density of the inert stripping gas in grams per cubic centimeter, passing stripping gas and vaporized organic material after passage through said bed through a plurality of horizontally spaced apart flow restricting passages uniformly distributed across the horizontal cross-sectional area of said evaporation zone in the upper section thereof, discharging stripping gas and vaporized material from said passages in the upper section of said evaporation zone, and removing stripping gas and vaporized material from the upper section of said evaporation zone.

3. A continuous process for the evaporation of a vaporizable organic material from an adsorbent of palpable particulate form which comprises: maintaining a bed of adsorbent within the lower section of a confined evaporation zone in a state of ebullient motion which resembles a boiling fluid, introducing adsorbent-bearing vaporizable organic material into the evaporation zone, removing adsorbent free of vaporizable organic material from the evaporation zone at a level adjacent the supper surface of said bed and at a point laterally displaced from the point of introduction of adsorbent to said bed, passing a moisture containing stripping gas upwardly through said bed to strip the adsorbent of vaporized organic material and to maintain said bed in a state of ebullient motion, at a superficial velocity with the range, the lower limit of which is $$V = \frac{78 D_p{}^2 F^3 \left[ \frac{S_L}{2} + \frac{S_a}{1-F}\left(1 - \frac{S_L}{2S_t}\right) - S_g \right]}{Z(1-F)}$$

and the upper limit of which is $$V = \frac{104 D_p{}^2 F^3 \left[ \frac{S_L}{2} + \frac{S_a}{1-F}\left(1 - \frac{S_L}{2S_t}\right) - S_g \right]}{Z(1-F)}$$

where $V$=superficial velocity of stripping gas in feet per second, $D_p$=average particle diameter of the adsorbent in inches, $Z$=viscosity of the stripping gas in centipoises, $S_a$=apparent density of the adsorbent in grams per cubic centimeter, $F$=the fractional voids between the adsorbent particles under the same conditions at which $S_a$ is determined, $S_L$=density of the vaporizable organic material on the adsorbent in grams per cubic centimeter, $S_t$=true density of the adsorbent in grams per cubic centimeter, and $S_g$=density of the stripping gas in grams per cubic centimeter, passing a heat transfer fluid in indirect heat exchange relationship with said bed and heating said bed thereby to a temperature above 300° F. so that the moisture on the adsorbent as it leaves the evaporation zone is less than 4.5 percent by weight, and removing stripping gas and vaporized organic material from the upper section of the evaporation zone after said heating.

4. A continuous process for the evaporation of a vaporizable organic material from a spent adsorbent of palpable particulate form also having a non-vaporizable carbonaceous contaminant deposited thereon which comprises: maintaining a bed of adsorbent within the lower section of a confined evaporation zone in a state of ebullient motion which resembles a boiling fluid, passing a heat transfer fluid in indirect heat exchange relationship with said bed and heating the bed thereby to a temperature above 300° F. so that the moisture content of the adsorbent is maintained less than 4.5 percent by weight and the vaporizable organic material is vaporized, introducing spent adsorbent having non-vaporizable carbonaceous contaminants and vaporizable organic material deposited thereon into the evaporation zone and onto the upper surface of the bed, passing moisture containing stripping gas upwardly through said bed to strip the adsorbent of vaporizable organic material, removing stripping gas and vaporized organic material from the upper end of said bed and then from the upper section of the evaporation zone, removing adsorbent from the evaporation zone at a level adjacent to the upper surface of the bed and passing said adsorbent to a confined regeneration zone wherein the carbonaceous contaminants may be removed from the adsorbent without the temperature of the adsorbent falling below 300° F. so that the moisture content of the adsorbent is maintained below about 4.5 percent by weight during such passage to the regeneration zone.

5. A process for removing from adsorbents of palpable particulate form a vaporizable organic material, which comprises: maintaining a bed of adsorbent within a confined evaporation zone in a state of ebullient motion resembling a boiling fluid maintaining the temperature of the bed above 350° F. so that the moisture content of the adsorbent is maintained below about 4 percent by weight by indirect heat exchange with a heat transfer fluid and so that the vaporizable organic material vaporizes, passing adsorbent having vaporizable organic material thereon into the evaporation zone, removing adsorbent from the evaporation zone, introducing superheated steam into the lower section of the bed, passing the steam upwardly through the bed at a superficial velocity within the range the lower limit of which is defined by, $$V=\frac{67D_p^2F^3\left[\frac{S_L}{2}+\frac{S_a}{1-F}\left(1-\frac{S_L}{2S_t}\right)-S_g\right]}{Z(1-F)}$$

and the upper limit of which is defined by $$V=\frac{117D_p^2F^3\left[\frac{S_L}{2}+\frac{S_a}{1-F}\left(1-\frac{S_L}{2S_t}\right)-S_g\right]}{Z(1-F)}$$

where $V$=superficial steam velocity in feet per second, $D_p$= average particle diameter of the granular adsorbent in inches, $Z$=viscosity of the stripping steam in centipoises, $S_L$=density of the vaporizable organic material deposited on the adsorbent in grams per cubic centimeter, $S_a$=apparent density of the adsorbent in grams per cubic centimeter, $F$=the fractional voids between the contact material particles under the same conditions at which $S_a$ is determined, $S_t$=true density of the adsorbent in grams per cubic centimeter and $S_g$=density of the stripping steam in grams per cubic centimeter, and removing steam and vaporized organic material from the adsorbent from the upper section of the drying zone.

6. A process for the evaporation of liquid material from an adsorbent solid of palpable particulate form which comprises: maintaining a bed of the adsorbent within a confined evaporation zone in a state of ebullient motion, transferring heat to the bed by indirect heat transfer in sufficient quantity to vaporize the liquid material, continuously supplying adsorbent bearing liquid material to the bed, continuously removing adsorbent from the bed, passing stripping gas upwardly through the bed at a superficial velocity within the range the lower limit of which is:

$$V=\frac{78D_p^2F^3\left[\frac{S_L}{2}+\frac{S_a}{1-F}\left(1-\frac{S_L}{2S_t}\right)-S_g\right]}{Z(1-F)}$$

and the upper limit of which is $$V=\frac{104D_p^2F^3\left[\frac{S_L}{2}+\frac{S_a}{1-F}\left(1-\frac{S_L}{2S_t}\right)-S_g\right]}{Z(1-F)}$$

where $V$=superficial velocity of stripping gas in feet per second, $D_p$=average particle diameter of the adsorbent in inches, $Z$=viscosity of the stripping gas in centipoises, $S_L$=density of the liquid material in grams per cubic centimeter, $S_a$=apparent density of the adsorbent in grams per cubic centimeter, $F$=fractional voids between adsorbent particles under the conditions at which $S_a$=true density of the adsorbent in grams per cubic centimeter and $S_g$= density of the stripping gas in grams per cubic centimeter and removing stripping gas and vaporized liquid material from the upper section of the bed.

References Cited in the file of this patent

UNITED STATES PATENTS

| | | |
|---|---|---|
| 2,478,970 | Koon | Aug. 16, 1949 |
| 2,724,190 | Bergstrom | Nov 22, 1955 |

OTHER REFERENCES

Morse: Industrial and Engineering Chemistry, June 1949, pp. 1117 to 1124.

UNITED STATES PATENT OFFICE
Certificate of Correction Patent No. 2,813,352 November 19, 1957

John W. Payne et al.

It is hereby certified that error appears in the printed specification of the above numbered patent requiring correction and that the said Letters Patent should read as corrected below.

Column 10, line 12, for "supper" read —upper—; column 12, line 25, for "$S_a$=true density" read —$S_a$ is measured, $S_t$=true density—.

Signed and sealed this 11th day of March 1958.

[SEAL]

Attest:
KARL H. AXLINE,
*Attesting Officer.*

ROBERT C. WATSON,
*Commissioner of Patents.*